Figure 1:
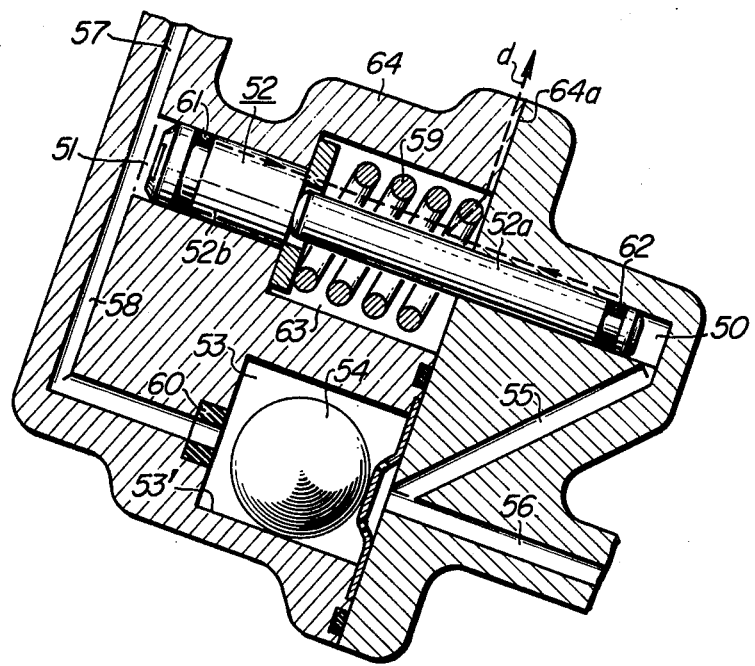

United States Patent [19]

Nogami et al.

[11] 4,099,791
[45] Jul. 11, 1978

[54] HYDRAULIC BRAKE PRESSURE CONTROL APPARATUS FOR VEHICLES

[75] Inventors: Tomoyuki Nogami, Toyota; Takaaki Ohta, Okazaki, both of Japan

[73] Assignee: Toyota Jidosha Kogyo Kabushiki Kaisha, Toyota, Japan

[21] Appl. No.: 820,246

[22] Filed: Jul. 29, 1977

[30] Foreign Application Priority Data

Dec. 2, 1976 [JP] Japan ................................ 51-145142

[51] Int. Cl.$^2$ ............................................ B60T 8/093
[52] U.S. Cl. .................................. 303/24 F; 303/84 R
[58] Field of Search .................. 303/6 C, 22 R, 24 A, 303/24 C, 24 F

[56] References Cited

U.S. PATENT DOCUMENTS

| 3,245,729 | 4/1966 | Shellhause | 303/24 F |
| 3,252,740 | 5/1966 | Stelzer | 303/24 F X |
| 3,795,424 | 3/1974 | Lewis | 303/24 F X |

Primary Examiner—Duane A. Reger
Attorney, Agent, or Firm—Cushman, Darby & Cushman

[57] ABSTRACT

The control apparatus comprises a housing having first and second hydraulic pressure chambers formed therein and communicated to each other through a communication passage. The first hydraulic pressure chamber is hydraulically communicated with a master cylinder actuated by a brake pedal of the vehicle, while the second chamber is hydraulically communicated with the rear wheel brake cylinders. A differential piston is axially movably disposed within the housing and having one end portion exposed to the first hydraulic pressure chamber and the other end portion projecting into the second hydraulic pressure chamber. The effective area of the differential piston subjected to the hydraulic pressure is made smaller at the one end portion thereof located in the first pressure chamber than at the other end portion located in the second pressure chamber by forming a sealed air chamber adjacent to the first pressure chamber between the inner wall of the differential piston and a stationary sleeve on which the piston is movably supported. An inertia valve member is disposed in the first hydraulic pressure chamber and adapted to close the communication passage when deceleration of the vehicle attains a predetermined value.

9 Claims, 5 Drawing Figures

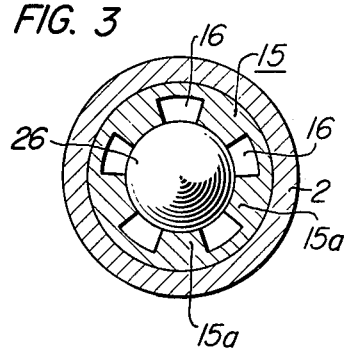
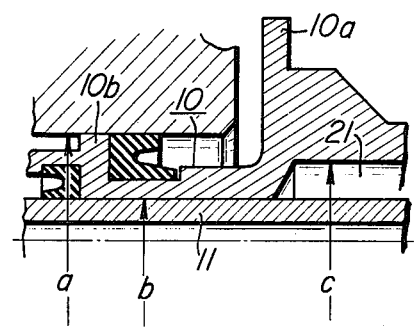
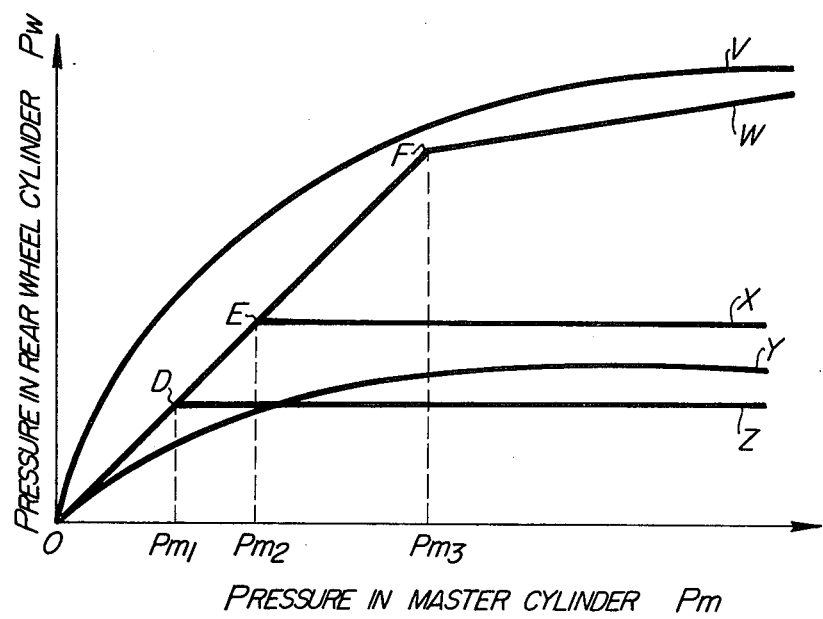

HYDRAULIC BRAKE PRESSURE CONTROL APPARATUS FOR VEHICLES

The present invention relates in general to a hydraulic brake system for a motor vehicle and in particular to a hydraulic brake pressure control apparatus provided in a hydraulic circuit connecting a master brake cylinder to hydraulic brake cylinders for rear wheels and adapted to control hydraulic brake pressure fed to the rear wheel brake cylinders upon braking the running vehicle.

Heretofore, there have been proposed various control systems for preventing a skid of wheels possibly occurring upon braking the vehicle by adjusting distribution ratio of hydraulic brake pressure delivered to the hydraulic brake cylinders for the front and the rear wheels. In a typical measure for carrying out such adjustment, a hydraulic brake pressure control apparatus is installed in a hydraulic circuit connecting a master cylinder operable by a brake pedal to the hydraulic brake cylinders for the rear wheels with a view to controlling the hydraulic brake pressure delivered to the brake cylinders for rear wheels in a proper ratio relative to the hydraulic pressure in the master cylinder. In this case, the hydraulic brake medium or oil is directly supplied to the front wheel brake cylinders from the master cylinder.

In a hydraulic brake pressure control apparatus of a hitherto proposed type, an inertia valve member which is responsive to a predetermined level of deceleration and a differential piston are accommodated within a casing or housing of the control apparatus. When the deceleration of vehicle attains a predetermined value, then the inertia valve member or element is actuated under inertia thereby to interrupt flow of the hydraulic brake medium into the rear wheel brake cylinders. If the hydraulic pressure in the master cylinder increases further after such interruption, then the differential piston is displaced thereby to allow the hydraulic pressure fed to the rear wheel brake cylinders to be increased to a preselected rate relative to the increase in the hydraulic pressure in the master cylinder. In this manner, the braking force applied to the rear wheels is properly controlled.

However, the hitherto known hydraulic brake pressure control apparatus suffers from drawbacks that there exists a large possibility of the hydraulic brake pressure medium or oil being leaked outwardly from the housing particularly through the engaging portions of the differential piston with the housing, which results in the necessity of a large number of sealing members as well as difficulty in the brake control for the rear wheels after occurrence of such hydraulic brake pressure medium leakage.

Accordingly, an object of the invention is to provide an improved hydraulic brake pressure control apparatus for a vehicle which is immune from the drawbacks of the hitherto proposed control apparatus described above.

Another object of the invention is to provide a hydraulic brake pressure control apparatus for controlling brake pressure fed to brake cylinders for rear wheels of a vehicle in which leakage of a hydraulic pressure medium or oil externally from the housing of the control apparatus can be significantly reduced.

Still another object of the invention is to provide a hydraulic brake pressure control apparatus of the above mentioned type in which operation of the control apparatus is scarcely subjected to adverse influence even if the oil leakage should occur.

With the above and other objects in view, there is provided according to an important aspect of the invention an apparatus for controlling hydraulic pressure delivered to hydraulic brake cylinders for rear wheels of a vehicle which comprises a housing having an inlet port adapted to be hydraulically communicated with a master brake cylinder and an outlet port adapted to be hydraulically communicated with hydraulic brake cylinders for rear wheels, the housing being composed of a main housing portion having an opening and a plug block fitted into the opening a first hydraulic pressure chamber formed in said housing and communicated with the inlet port, a second hydraulic pressure chamber formed in the housing and communicated with the outlet port, a communication passage for communicating therethrough the first and the second hydraulic pressure chambers, a differential piston axially slidably accommodated within the housing and having one end portion located within the first chamber and the other end portion located within the second chamber, the one end portion of the differential piston having a smaller effective area which is responsive to the hydraulic pressure than an effective area of the other end portion, spring means for constantly urging the differential piston toward the second chamber, an inertia valve element accommodated movably within the housing and adapted to close the communication passage in response to a predetermined deceleration of the vehicle, means extending through the differential piston for guiding the sliding movement of the piston, and a sealed air chamber defined between the differential piston and the guiding means, the sealed air chamber being adapted to be introduced thereinto a hydraulic medium leaked through engaging portions of the differential piston with the guiding means to thereby prevent the hydraulic medium from leaking outwardly from the housing.

According to another aspect of the invention, the sealed air chamber is disposed within the housing at a position adjacent to the first chamber so that the effective area of the differential piston subjected to hydraulic pressure in the first hydraulic pressure chamber is made smaller than the effective area of the piston subjected to the hydraulic pressure in the second hydraulic pressure chamber.

Figure 2:
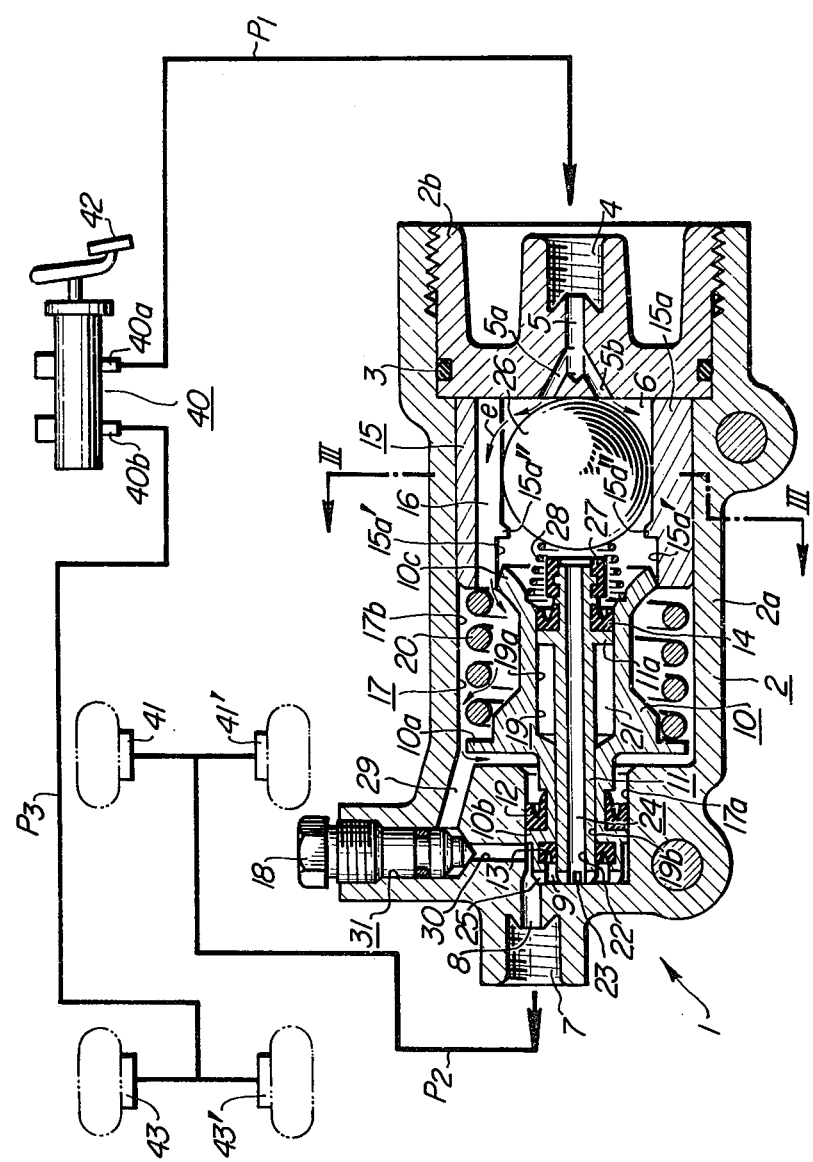

The above and other objects, features as well as advantages of the invention will become more apparent from the description of a preferred embodiment of the invention made in comparison with a hitherto proposed hydraulic brake pressure control apparatus. The description makes reference to the accompanying drawings, in which:

FIG. 1 is a sectional view illustrating a hitherto known hydraulic brake pressure control apparatus for a motor vehicle;

FIG. 2 illustrates, in a vertical sectional view, a hydraulic brake pressure control apparatus according to an embodiment of the invention together with an associated hydraulic brake system shown only schematically, FIG. 3 is a sectional view taken along the line III—III in FIG. 2, FIG. 4 is an enlarged partial view of FIG. 2, illustrating effective area of a differential piston on which hydraulic pressure acts, and FIG. 5 graphically illustrates performance characteristics obtained by using the hydraulic brake pressure control apparatus shown in FIGS. 2 to 4 in comparison with ideal braking characteristics.

Before enterring into detailed description of preferred embodiment of the invention, description will be first made on a hydraulic brake control apparatus of the prior art in order to have a better understanding of the invention.

Referring to FIG. 1, there is shown an example of hitherto known hydraulic brake control apparatus. The apparatus comprises a housing 64, first and second hydraulic pressure chambers 50 and 51 formed in the housing 64, a differential piston 52 adapted to be actuated in response to difference in pressure between the first and the second chambers 50 and 51, and a spherical inertia valve element 54 movably accommodated within a third hydraulic chamber 53. The first hydraulic pressure chamber 50 is adapted to be communicated with a master cylinder (not shown) operable by a brake pedal (not shown) through passages 55 and 56, while the second hydraulic pressure chamber 51 is adapted to be communicated with hydraulic brake cylinders for rear wheels (not shown). In operation, when the deceleration of the vehicle is at a low level and thus the inertia valve element 54 is at the non-operative position shown in FIG. 1, the first chamber 50 is then communicated with the second chamber 51 through the passage 55, the third hydraulic chamber 53 and the passage 58, with the result that the hydraulic pressure from the master cylinder is imparted to both the first and second hydraulic chambers 50 and 51 and hence to the hydraulic brake cylinders for the rear wheels through the passage 57. Thus, increase in the pressure in the master cylinder will be accompanied with a corresponding increase in the pressure within the brake cylinders for the rear wheels. At that time, the hydraulic pressure in the first and the second chambers 50 and 51 will act on the end surface of the reduced piston portion 52a and the end surface of the enlarged piston portion 52b, respectively, as a result of which the differential piston 52 tends to be displaced to the right-hand side as viewed in FIG. 1 due to difference in the effective area between the end surfaces of the reduced and the enlarged piston portions 52a and 52b. When the differential pressure thus produced and acting on the piston 52 becomes sufficiently high to overcome the spring force of the opposite direction exerted by a spring 59, the differential piston 52 will be then displaced to the right-hand side as viewed in FIG. 1. When the deceleration of the vehicle attains a predetermined level, the spherical intertia valve element 54 will roll on an inclined bottom surface 53' of the third chamber 53 upwardly to finally sit on a valve seat 60, whereby flow of hydraulic medium or oil into the second chamber 51 and hence into the rear wheel brake cylinders will be interrupted. It is to be noted that the differential piston 52 has been displaced to the right-hand side at the time when the hydraulic medium flow into the second chamber 51 is interrupted as described above. Accordingly, further subsequent increase in the hydraulic pressure within the master cylinder as brought about by corresponding actuation of the brake pedal will result in corresponding increase in the pressure within the first chamber 50, whereby the differential piston 52 will be displaced to the left-hand side as viewed in FIG. 1. Then, the hydraulic brake oil in the second chamber 51 tends to be compressed to produce a correspondingly increased pressure in the rear wheel brake cylinders. In this manner, even after the deceleration has attained a predetermined level, the hydraulic pressure in the rear wheel brake cylinders is caused to increase in a certain rate in dependence on the increase in hydraulic pressure within the master cylinder.

The hitherto known hydraulic brake control apparatus described above however suffers from a drawback that the hydraulic brake medium or oil tends to leak from the first and second chambers through seal members 61 and 62 provided in the differential piston 52 into a chamber 63 in which a portion of the reduced piston portion 52a and the spring 59 are disposed and hence leaks outwardly from the housing 64 through clearance inevitably formed in an abutment wall portion 64a of blocks constituting the housing 64 due to manufacturing tolerance, as indicated by broken line arrows d. Should such leakage of hydraulic oil occur, then it will obviously become difficult to control properly the brake force applied to the rear wheels by supplying brake oil to the associated brake cylinders.

In the present invention, it is contemplated to eliminate such drawback of the hitherto known hydraulic brake control apparatus as described above.

Now, an exemplary embodiment of the hydraulic brake control apparatus according to the invention will be described in detail by referring to FIGS. 2 to 4. As can be seen from FIG. 2, the hydraulic brake control apparatus generally denoted by reference numeral 1 is installed in a hydraulic line or circuit $P_1$ which connects hydraulically a tandem type master cylinder 40 at an exit or outlet port 40a to hydraulic brake cylinders 41 and 41' for the rear wheels of a motor vehicle. The master cylinder 40 further has other exit or outlet port 40b connected directly to hydraulic brake cylinders 43 and 43' for the front wheels through a hydraulic line or conduit $P_2$. Numeral 42 denotes a brake pedal for actuating the master cylinder 40. In this conjunction, it should be mentioned that the control apparatus is so oriented relative to the motor vehicle that the left-hand side of the control apparatus 1 as viewed in FIG. 2 is positioned at the front side of the motor vehicle.

The hydraulic brake control apparatus comprises a housing 2 which is composed of a housing main portion 2a and a plug block 2b threadedly attached thereto at the right-hand side end with a seal member 3 interposed therebetween. Formed in the plug block 2b are an inlet opening 4 for hydraulic brake pressure medium or oil and a passage 5 for communicating the inlet port 4 to a first hydraulic pressure chamber 6 described hereinafter. On the other hand, the housing main portion 2a is formed in the left-hand side wall with an outlet opening 7 for the brake oil and a passage 8 for connecting the outlet port 7 to a second hydraulic pressure chamber 9 described hereinafter.

Formed in the housing 2 is a bore 17 having offset inner wall portions, which bore is communicated at one end to the inlet port 4 through the passage 5 and at the other end to the outlet port 7 through the passage 8. An annular member 15 having a plurality of inner projections or teeth 15a is fitted into the offset bore 17 adjacent to the inlet port 4 with the right side end face thereof abutting on the plug portion 2b. As can be best seen from FIG. 3, the inner projections or teeth 15a are spaced from one another on the circumferential direction, whereby passages 16 for the hydraulic brake oil are formed between these projections 15a.

Reference numeral 10 denotes a differential piston having a radial protrusion 10b formed at a position near to the left end thereof. With the aid of the radial protrusion 10b, the differential piston 10 is axially slidably mounted in the reduced bore portion 17a having a small diameter of the offset bore 17 in a fluid tight manner through a seal member 12. The first hydraulic pressure chamber 6 is defined outside the differential piston 10 at the right-hand side of the radial protrusion 10b, while the second hydraulic pressure chamber 9 is defined at the left-hand side of the radial protrusion 10b, as viewed in FIG. 2. One side of the first hydraulic chamber 6 is communicated with the inlet port 4 through the passage 5 so that the hydraulic medium or brake oil from the inlet port 4 may reach the radial protrusion 10b after having flown through the passage 16 formed in the annular member 15 and hence through the space surrounding the differential piston 10, as indicated by arrows e. The second chamber 9 is communicated with the outlet port 7 through the passage 8, as described hereinbefore. The differential piston 10 is further formed with an inclined flange 10c at the right end thereof as viewed in FIG. 2, which flange 10c slidably engages at the outer peripheral edge thereof with an inner guide surface 15a' formed in the inner surface of the annular member 15 at the left-hand side portion of the projections or teeth 15a. In FIG. 2, reference character 15a" denotes a stopper for limiting the rightward displacement of the differential piston 10.

Formed in the differential piston 10 at the leftmost portion thereof located within the enlarged bore portion 17b of the offset bore 17 is a flange-like projection 10a having a diameter slightly smaller than the inner diameter of the enlarged bore portion 17b. A first coil spring 20 is interposed between the flange-like projection 10a and the annular member 15. Thus, the differential piston 10 is usually biased leftwards by the spring 20. The rightward displacement of the piston 10 can be adjustably restricted by the spring 20.

Additionally formed in the differential piston 10 is an offset through-bore 19 which extends axially through the piston 10 and has an enlarged bore portion 19a and a reduced bore portion 19b at the right and left hand sides thereof, respectively. A tubular guide sleeve 11 having an outer diameter substantially equal to the inner diameter of the reduced bore portion 19b is inserted into the through-bore 19 so that the differential piston 10 may be moved on the sleeve 11. It should be noted that the guide sleeve 11 has a flange-like projection 11a formed near the right end portion thereof, which projection 11a is so dimensioned that the enlarged through-bore portion 19a is closed by the projection 11a at the right side facing the first chamber 6 upon mounting the sleeve 11 into the through-bore 19 of the differential piston 10 thereby to form an annular air chamber 21 between the inner wall of the enlarged through-bore portion 19a and the outer peripheral surface of the guide sleeve 11 in a fluide-tight manner. A communication passage 24 is formed extending axially through the sleeve 11 to communicate the first and second hydraulic chambers 6 and 9 with each other. The communication passage 24 is composed of an axial through-hole 22 having a notch 23 formed at the left end thereof. In FIG. 2, reference numerals 13 and 14 denote seal members which serve to assure the sliding displacement of the differential piston 10 relative to the guide sleeve 11 in a fluid-tight manner to resist invasion of oil into the closed air chamber 21. Numeral 25 denotes notches through which the hydraulic medium can flow into the second chamber 9 from the passage 24.

As will be readily appreciated, the hydraulic pressure in the second chamber 9 exerts a force on the differential piston 10 to move it rightward, while the hydraulic pressure in the first chamber 6 acts on the piston 10 to urge it leftward. In this conjunction, it is to be noted that the effective area of the differential piston 10 over which the hydraulic pressure is exerted is so selected that the area is smaller in the first hydraulic pressure chamber 6 than in the second chamber 9. In more particular, referring to FIG. 4, the effective areas A and B of the differential piston 10 in the first and second hydraulic chambers 6 and 9, respectively, are given by the following expressions:

$$A = \frac{\pi}{4} (a^2 - c^2)$$

$$B = \frac{\pi}{4} (a^2 - b^2)$$

Thus, difference in effective area, i.e. B—A is given by $\pi/4(c^2 - b^2)$, where
- $a$: diameter of the radial projection 10b of the differential piston 10,
- $b$: inner diameter of the reduced bore portion 19b, and
- $c$: inner diameter of the enlarged bore portion 19a and hence of the air chamber 21.

As can be seen from the above expressions, the effective area of the differential piston 10 for the pressure in the first chamber 6 to urge the piston 10 leftward is reduced as compared with the effective area in the second chamber due to the arrangement such that the sealed air chamber 21 is formed between the differential piston 10 and the guide sleeve 11. In this manner, when the hydraulic pressure of the same magnitude is applied to both the first and second hydraulic chambers 6 and 9 which are communicated with each other through the passage 24, the force which urges the differential piston 10 to the right wall become larger than that urging the piston 10 leftward, as viewed in FIG. 2. When the difference between the forces acting on the piston 10 in the opposite directions becomes larger than the resilient force exerted by the first spring 20, then the differential piston 10 will be displaced rightward. In this connection, it will be noted that the hydraulic pressure within the first hydraulic chamber 6 will act on the right-hand surface of the flange-like protrusion 11a of the guide sleeve 11 through the seal member 14. Accordingly, when the hydraulic pressure is produced in the first and second chambers 6 and 9, the sleeve 11 is always so positioned that the left end thereof abuts on the left-hand side wall of the housing 2.

The spherical inertia valve element 26 is accommodated within the right-hand portion of the first hydraulic chamber 6, i.e. in the annular member 15 and adapted to roll along the inner surface of the projection 15a' formed in the annular member 15. The spherical inertia valve element 26 is positioned in opposition to the valve seat 27 provided at the right end portion of the sleeve 11 and adapted to be rollingly displaced under inertia force in the direction toward the front side of the vehicle (or leftward, as viewed in FIG. 2) to seat on the valve seat 27 thereby to close the communication passage 24, when the vehicle attains a predetermined deceleration level. Interposed between the right end portion of the differential piston 10 and the spherical valve element 26 is a second coil spring 28 having a preselected spring force which serves to constantly urge the spherical inertia valve element 26 rightward. The second coil spring 28 shown in FIG. 2 is of a frustro-conical configuration converging toward the valve element 26 to hold securely the valve element at the substantially middle portion of the valve element 26 by the abutting spring end of a reduced coil diameter.

As will be described in detail hereinafter, the second spring 28 has a function to adjustably set the valve of deceleration of vehicle which gives rise to the rolling displacement of the spherical inertia valve element 26 in dependence on the weight of vehicle. In the case where such effect is not desired, it is possible to eliminate the second spring 28. However, when the spring 28 is not employed, it is necessary to provide a suitable means to restrict the rolling displacement of the inertia valve element 26 under inertia produced upon a predetermined deceleration of vehicle, such as a hitherto known inclined rolling path as shown in FIG. 1, for example.

As will be appreciated from the foregoing description, the embodiment illustrated in FIG. 2 is constructed such that the spherical inertia valve element 26 accommodated within the annular member 15 mounted in the first hydraulic chamber 6 is adapted to seat on the valve seat 27 provided at the right end portion of the sleeve 11 thereby to close the communication passage 24, while the differential piston 10 in turn is adapted to be displaced with the right end portion thereof guided along the guide surface 15a' constituted by the inner faces of the projections or teeth 15a of the annular ring 15. This arrangement allows the control apparatus 1 to be constructed in a compacted structure. However, it should be mentioned that other arrangement may be adopted within the scope of the invention. For example, the spherical valve element may be disposed in the third hydraulic chamber formed in the housing such that the communication between the first and second hydraulic chambers is interrupted through the rolling movement of the spherical valve element, as in the case of the hitherto known control apparatus shown in FIG. 1.

Referring again to FIG. 2, it will be seen that the passage 5 formed in the plug block 2b of the housing 2 is communicated with the first hydraulic pressure chamber 6 through a plurality of orifice passages 5a and 5b which extend radially outwardly into the chamber 6 with an inclination relative to the longitudinal axis of the apparatus. By virtue of such arrangement of the orifice passages 5a and 5b, the brake oil is introduced into the first hydraulic chamber 6 in a form of oil jets directly impinging on the spherical valve element 26.

As is well known in the art, upon abrupt braking of a vehicle, there will arise usually a time lag between the generation of hydraulic brake pressure and the initiation of vehicle deceleration, which causes in turn a corresponding time lag in the initiation of the rolling movement of the spherical inertia valve element. However, the above described arrangement of the orifice passages 5a and 5b according to the teaching of the invention permits the time lag in the initiation of the movement of the inertia valve element to be reduced at minimum, since oil jets from the orifice passages 5a and 5b will promote hydrodynamically the movement of the spherical valve element 26 toward the associated valve seat 27. It will be understood that the hydrodynamic pressure of the oil jets imparted to the spherical inertia valve element can be properly adjusted by selecting appropriately the number, inner diameter and the inclined angle of the orifice passages 5a and 5b.

There is formed in the left upper portion of the housing 2 an air venting hole or port 31 which is closed by a threadedly mounted plug 18. The air venting port 31 has a lower portion branched into a passage 29 communicated with the first hydraulic pressure chamber 6 and a passage 30 communicated with the second hydraulic pressure chamber 30. Thus, it is possible to vent air from both chambers 6 and 9 through the port 31.

Now, description will be made on operation of the hydraulic brake control apparatus 1 of the construction described above.

In the first place, it is assumed that the brake pedal 42 is actuated when the vehicle is in the no-load state. The hydraulic pressure thus produced in the master cylinder 40 is transmitted directly to the brake cylinders 43 and 43' for the front wheels from the exit port 40b through the conduit $P_2$. Simultaneously, the hydraulic pressure is transmitted to the first hydraulic pressure chamber 6 from the exit or outlet port 40a of the master cylinder 40 through the conduit $P_1$, inlet port 4 and the passage 5. Hence, the hydraulic pressure is transmitted to the second hydraulic pressure chamber 9 through the communication passage 24 and notches 25 and hence to the rear wheel brake cylinders 41 and 41' through the passage 8, exit port 7 and the conduit $P_1$. In this manner, increase in the hydraulic pressure within the master cylinder 40 due to the actuation of the brake pedal is transmitted to the hydraulic brake cylinders 41, 41': 43, 43' for the respective wheels, whereby brake force of the magnitude proportional to the increased hydraulic pressure is applied to the wheels.

FIG. 5 graphically illustrates relationships between hydraulic pressures $P_m$ and $P_w$ in the master cylinder and the rear wheel brake cylinder, respectively. Characteristic curve Z represents the relation in the no-load condition of a vehicle installed with a hydraulic brake control apparatus according to the invention. As will be apparent from this characteristic curve Z, the hydraulic pressure $P_w$ in the rear wheel brake cylinder will increase at a constant rate as the hydraulic pressure $P_m$ in the master cylinder is increased, so far as the latter remains in a range lower than a predetermined pressure value $P_{ml}$ (refer to a line segment O–D). when the deceleration of vehicle attains a predetermined value $g_l$ upon the hydraulic pressure $P_m$ in the master cylinder attaining the predetermined level $P_{mb}$ the spherical valve element 26 will be then rollingly displaced in the direction toward the front side of vehicle (or leftward as viewed in FIG. 2) to finally seat on 24 is closed. Thus, the hydraulic pressure $P_w$ in the rear wheel brake cylinders is thereafter maintained constant without being increased, even if the hydraulic pressure $P_m$ in the master cylinder should be further increased. It should be noted that the characteristic curve Z described above approximates substantially to a curve Y which represents an ideal hydraulic pressure distribution at which no skid of wheels may occur in the no-load state of a vehicle, as is known in the art.

When the hydraulic pressure in the first and second chambers 6 and 9 is increased due to supply of brake oil from the master cylinder 40, a force which tends to urge the differential piston 10 rightward against the counter spring force exerted by the first spring 20 is produced due to the difference in the effective areas of the differential piston between the portions thereof exposed to the hydraulic pressure in both chambers 6 and 9. In this conjunction, it should be mentioned that characteristic curves shown in FIG. 5 and obtained by using the hydraulic brake pressure control apparatus according to the invention correspond to such operating conditions of the control apparatus in which displacement of the differential piston 10 is essentially prevented from taking place in the non-load condition of vehicle by using the first spring 20 having an appropriate spring force.

In the loaded condition of the vehicle, actuation of the brake pedal 42 results likewise in application of an increased hydraulic pressure from the master cylinder to the respective wheel brake cylinders 41, 41'; 43, 43', whereby the vehicle is decelerated as in the case where the vehicle is in the no-load condition. The relationship between the hydraulic pressures $P_m$ and $P_w$ in the master cylinders and the rear wheel brake cylinders, respectively, under the loaded condition of the vehicle is represented by a characteristic curve W in FIG. 5. In such loaded state of vehicle, even when the hydraulic pressure $P_m$ in the master cylinder has attained the predetermined level $P_{m1}$, no movement of the spherical valve element 26 will occur since the deceleration of vehicle has not yet reached the predetermined value $g_1$. When the hydraulic pressure $P_m$ in the master cylinder is further increased beyond $P_{m1}$, the force acting on the differential piston 10 to urge it rightward will overcome the spring force of the first spring 20, as a result of which the differential piston 10 is displaced rightward to store a spring energy in the compressed spring 28. Under such condition, even when the hydraulic pressure $P_m$ in the master cylinder is increased to a value $P_{m2}$ at which the deceleration attains the predetermined value $g_1$, the spherical inertia valve element 26 is prevented from being rollingly displaced in the direction toward the front side of vehicle (or leftward as viewed in FIG. 2) due to the increased counter spring force of the second spring 28 caused by the aforementioned displacement of the differential piston 10. However, when the hydraulic pressure $P_m$ in the master cylinder is further increased to a level $P_{m3}$ with the deceleration attaining a predetermined value $g_2$ higher than $g_1$, the spherical inertia valve element 26 is then rollingly displaced against the increased spring force of the second spring 28 to seat on the valve seat 27 thereby to close the communication passage 24 (refer to point F in FIG. 5). It is to be noted that the differential piston 10 remains in the state having been displaced rightward at the time when the communication between the first and the second hydraulic chambers 6 and 9 is interrupted by the valve element 26. Accordingly, further increase in the hydraulic pressure $P_m$ within the master cylinder 40 after the closure of the communication passage 24 will bring about displacement of the differential piston 10 to the left in correspondence to the increase in the hydraulic pressure $P_m$ in the master cylinder. This of course results in compression of the hydraulic medium or oil in the second hydraulic chamber 9, thereby to increase the pressure therein. In this manner, the hydraulic pressure $P_w$ in the rear wheel brake cylinders is increased at the rate of 1:1 in dependence on the increase in the hydraulic pressure $P_m$ in the master cylinder 40 until the hydraulic pressure $P_m$ of the latter attains the value $P_{m3}$ (refer to line segment O-F in FIG. 5). On the other hand, when the hydraulic pressure $P_m$ in the master cylinder is increased beyond $P_{m3}$, the hydraulic pressure in the rear wheel brake cylinders will be increased at a rate lower than 1:1. As will be seen from FIG. 5, the characteristic curve W obtained in the loaded vehicle provided with the hydraulic brake control apparatus according to the invention approximates apparently to the ideal characteristics curve V known in the art.

It will now be understood that the hydraulic brake control apparatus according to the invention as shown in FIGS. 2 to 4 can properly control the hydraulic pressure applied to the rear wheel brake cylinders 41 and 41' both in the non-load state and loaded state of the vehicle.

Next, a characteristic curve X in FIG. 5 represents the performance of the control apparatus on the assumption that leakage of hydraulic oil into the sealed air chamber 21 occurs through the engaging portion between the differential piston 10 and the guide sleeve 11 in the loaded state of vehicle. If such oil leakage does occur and the air chamber 21 is filled with oil, no hydraulic force will be produced which urges the differential piston 10 to be displaced rightward, even when the hydraulic pressure is applied to both of the first and second hydraulic chambers 6 and 9. Thus, the second spring 28 will remain uncompressed with the spring force applied to the spherical valve element 26 being maintained constant. Under these conditions, when the hydraulic pressure $P_m$ in the master cylinder has attained the value $P_{m2}$ with the deceleration reaching the predetermined value $g_1$, the spherical inertia valve element 26 can now be moved to close the communication passage 24 (refer to point E in FIG. 5). The operation of the control apparatus succeeding to the closure or interruption of the communication passage 24 will be performed in the same manner as in the case of no-load condition of the vehicle described hereinbefore. In other words, the hydraulic pressure $P_w$ in the rear wheel brake cylinders will be increased in a constant rate until the hydraulic pressure $P_m$ in the master cylinder has attained the predetermined level $P_{m2}$. After the pressure $P_m$ has become higher than the level $P_{m2}$, the hydraulic pressure $P_w$ in the rear wheel brake cylinders will remain unvariable independently from any further increase in pressure $P_m$ in the master cylinder 40. In this conjunction, it is apparent that the performance of the hydraulic brake control apparatus 1 at the time when the aforementioned oil leakage occurs in the no-load state of the vehicle is substantially same as represented by the characteristic curve Z.

In summary, there has been proposed according to the teaching of the invention the hydraulic brake control apparatus of such construction that the differential piston 10 is slidably guided along the guide sleeve 11, that the difference in the effective areas of the differential piston 10 to produce hydraulic differential pressure acting thereon is provided by forming the sealed air chamber 21 between the differential piston 10 and the guide sleeve 11, and that hydraulic medium or oil leaked through the engaging portions of the piston 10 and the sleeve 11 is caused to flow into the sealed air chamber 21. With such structure, it is obvious that the disadvantage of the hitherto known control apparatus, (that is, oil leakage from the housing of the apparatus through the guide portion for the differential piston which makes it difficult to perform the braking operation as described hereinbefore) is satisfactorily eliminated. According to the invention, even if the oil leakage into the sealed air chamber 21 should occur, the control of the hydraulic pressure fed to the rear wheel brake system can be advantageously maintained through the rolling movement of the spherical inertia valve element 26.

Furthermore, by virture of such arrangement of the illustrated embodiment that the opening provided at the right end portion of the housing 2 is closed by the plug block 2b in a fluid-tight manner with the aid of the sealing member 3, the oil leakage outwardly from the housing 2 can be effectively prevented. In more particular, even if the housing 2 tends to be expanded outwardly under the hydraulic pressure within the first oil chamber 6, the assembly of the housing portion 2a and the plug block 2b can be maintained in a closely contacting state in the fluid-tight manner, whereby oil leakage particularly through the separated portion of the adjoining housing portion 2a and the plug portion 2b can be effectively suppressed.

Besides, by vitue of such construction that the second spring 28 is interposed between the differential piston 10 and the spherical inertia valve element 26 wherein the valve element 26 is allowed to be moved against the force of the second spring 28 upon occurrence of a predetermined deceleration, and that the spring force of the second spring 28 is caused to vary through the displacement of the differential piston 10 as described hereinbefore in conjunction with the illustrated embodiment, the deceleration of vehicle which gives rise to the movement of the inertia valve element can be varied in dependence upon weights of the vehicle, thereby to assure an appropriate hydraulic brake pressure $P_w$ for the rear wheel brake cylinders whether the vehicle is in the no-load or loaded state.

Although the invention has been described in conjunction with a preferred embodiment shown in the drawing, it will be appreciated for those skilled in the art that the invention will never be restricted to it but many variations and modifications will readily occur without departing from the spirit and scope of the invention.

What is claimed is:

1. An apparatus for controlling hydraulic pressure delivered to hydraulic brake cylinders for rear wheels of a vehicle comprising:
   a housing having an inlet port adapted to be hydraulically communicated with a master brake cylinder and an outlet port adapted to be hydraulically communicated with hydraulic brake cylinders for rear wheels;
   said housing being composed of a main housing portion having an opening and a plug block fitted into said opening;
   a first hydraulic pressure chamber formed in said housing and communicated with said inlet port;
   a second hydraulic pressure chamber formed in said housing and communicated with said outlet port;
   a communication passage for communicating therethrough said first and said second hydraulic pressure chambers;
   a differential piston axially slidably accommodated within said housing and having one end portion located within said first chamber and the other end portion located within said second chamber;
   said one end portion of said piston having a smaller effective area which is responsive to the hydraulic pressure than an effective area of said other end portion;
   spring means for constantly urging said differential piston toward said second chamber;
   an inertia valve element accommodated movably within said housing and adapted to close said communication passage in response to a predetermined deceleration of said vehicle;
   means extending through said differential piston for guiding the sliding movement of said piston; and
   a sealed air chamber defined between said differential piston and said guiding means;
   said sealed air chamber being adapted to be introduced thereinto a hydraulic medium leaked through engaging portions of said differential piston with said guiding means to thereby prevent the hydraulic medium from leaking outwardly from said housing.

2. An apparatus as defined in claim 1, wherein said sealed air chamber is disposed between said differential piston and said guiding means at a position adjacent to said first chamber so that the effective area of said differential piston subjected to hydraulic pressure in said first hydraulic pressure chamber is made smaller than the effective area of said piston subjected to the hydraulic pressure in said second hydraulic pressure chamber.

3. An apparatus as defined in claim 1, wherein said guiding means is composed of a tubular sleeve defining therein said communication passage.

4. An apparatus as defined in claim 3, wherein said differential piston has an offset through-bore composed of a small diameter portion through which said guiding means extends in a snugly slidably fitted manner and a large diameter bore portion which constitutes said sealed air chamber in cooperation with said guiding means, said guiding means being formed with a flange snugly slidably engaging with an inner wall of said large diameter bore portion at the side facing toward said first hydraulic pressure chamber.

5. An apparatus as defined in claim 3, wherein said inertia valve element is disposed within said first hydraulic pressure chamber and adapted to close said communication passage formed in said guiding means in response to the predetermined deceleration of said vehicle.

6. An apparatus as defined in claim 5, further comprising a second spring interposed between said differential piston and said inertia valve element for adjustably setting the value of deceleration which gives rise to the movement of said inertia valve element to close said communication passage.

7. An apparatus as defined in claim 3, wherein said inertia valve element is of a spherical configuration, and the hydraulic pressure medium is supplied to said first hydraulic pressure chamber through a plurality of orifice passages in a form of jets directly impinging onto said spherical inertia valve element, thereby facilitating the movement of said inertia valve element in response to the predetermined deceleration of said vehicle.

8. An apparatus as defined in claim 1, wherein said plug block is screw fitted into the opening of said main housing portion, and said inlet port is formed in said plug block.

9. An apparatus as defined in claim 6, wherein said inertia valve element is of a spherical configuration, and said second spring is a coil spring of a frusto-conical configuration converging toward said inertia valve element.

* * * * *